US009990855B2

(12) United States Patent
Guettier et al.

(10) Patent No.: US 9,990,855 B2
(45) Date of Patent: Jun. 5, 2018

(54) METHOD FOR GUIDING AN AIRCRAFT

(71) Applicant: Safran Electronics & Defense, Boulogne-Billancourt (FR)

(72) Inventors: Christophe Guettier, Boulogne-Billancourt (FR); Julien Farjon, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days. days.

(21) Appl. No.: 15/305,634

(22) PCT Filed: Apr. 22, 2015

(86) PCT No.: PCT/EP2015/058654
§ 371 (c)(1),
(2) Date: Oct. 20, 2016

(87) PCT Pub. No.: WO2015/162152
PCT Pub. Date: Oct. 29, 2015

(65) Prior Publication Data
US 2017/0046963 A1   Feb. 16, 2017

(30) Foreign Application Priority Data
Apr. 22, 2014   (FR) ..................... 14 53590

(51) Int. Cl.
G05D 1/00      (2006.01)
G08G 5/06      (2006.01)
G06K 9/00      (2006.01)
G08G 5/00      (2006.01)
G01S 13/76     (2006.01)
G06K 9/52      (2006.01)
(Continued)

(52) U.S. Cl.
CPC ............ *G08G 5/065* (2013.01); *G01S 13/765* (2013.01); *G05D 1/0061* (2013.01); *G05D 1/0083* (2013.01); *G06K 9/00624* (2013.01); *G06K 9/00791* (2013.01); *G06K 9/52* (2013.01); *G06K 9/6201* (2013.01); *G06T 7/73* (2017.01); *G08G 5/0021* (2013.01); *G06K 2009/4666* (2013.01)

(58) Field of Classification Search
USPC .......................................................... 701/1
See application file for complete search history.

(56) References Cited

U.S. PATENT DOCUMENTS 5,172,317 A      12/1992   Nobuyoshi et al.
6,038,498 A  *   3/2000    Briffe .................... G01C 23/00
                                                          244/1 R
(Continued)

FOREIGN PATENT DOCUMENTS

EP   2378460 A1   10/2011
FR   2808588 A1   11/2001
FR   2911713 A1   7/2008

OTHER PUBLICATIONS

International Search Report with English Language Translation, dated May 13, 2015, PCT Application No. PCT/EP2015/058654.
(Continued)

*Primary Examiner* — Tyler Paige
(74) *Attorney, Agent, or Firm* — Womble Bond Dickinson (US) LLP

(57) ABSTRACT

The guiding method such as described correctly guides an aircraft on a platform of an airport, even in complex taxiing areas.

11 Claims, 3 Drawing Sheets

(51) Int. Cl.
G06K 9/62 (2006.01)
G06T 7/73 (2017.01)
G06K 9/46 (2006.01)

(56) References Cited

U.S. PATENT DOCUMENTS

| | | | |
|---|---|---|---|
| 2010/0292871 A1* | 11/2010 | Schultz | G01C 21/00 701/3 |
| 2013/0090787 A1* | 4/2013 | Ryu | G01S 13/94 701/3 |
| 2013/0151062 A1 | 6/2013 | Lee et al. | |
| 2017/0046963 A1* | 2/2017 | Guettier | G05D 1/0083 |

OTHER PUBLICATIONS

French Search Report with English Language Translation Cover Sheet, dated Dec. 17, 2014, French Application No. 1453590.

Q Maggie Zheng and Yiyuan J Zhao: "Systematic Procedure for Taxi-Route Conformance Monitoring", Journal of Aircraft, AIAA, Reston, VA, US, vol. 49, No. 6, Nov. 1, 2012 (Nov. 1, 2012), pp. 1953-1964.

\* cited by examiner

METHOD FOR GUIDING AN AIRCRAFT

GENERAL TECHNICAL FIELD

The invention relates to the field of the piloting aid in a shift phase on the ground of an aircraft and more precisely an improved autonomous guiding method during a taxiing phase.

PRIOR ART

During taxiing phases on the ground of an aircraft, the pilot of the aircraft must steer the latter between the tracks and the airport infrastructure totally safely despite reduced visibility.

To help the pilot in his task, there are guiding systems determining the position of the aircraft with respect to indicators on the ground, such as reflecting markings, studs or lamps, and using this information to guide the aircraft along a reference trajectory to be followed.

But some taxiing areas such as cross-over areas may present complex topology capable of causing errors in a guiding system, as shown in FIG. 1. The latter in fact risks taking into consideration for calculating a trajectory to be followed indicators inadequate and may then guide the aircraft in a wrong direction. Such an error in trajectory may present considerable security risks if the aircraft is guided out of a taxiway or else on a track already occupied by another unit.

There is therefore a need for a method monitoring the guiding of an aircraft so as to guide it correctly on a platform of an airport, even in complex taxiing areas, and limiting the impact of a guiding error.

PRESENTATION OF THE INVENTION

The present invention thus relates according to a first aspect to a method for guiding along a reference trajectory on a platform on the ground an aircraft having on board at least one detector of a plurality of indicators on the ground, said method comprising the following steps performed by a data-processing module capable of being connected to said at least one detector:
a) determining complex uncertainty areas of the platform geometrically from a mapping of the platform,
b) near one of said determined uncertainty areas, selecting at least one indicator from the plurality of indicators on the ground,
c) estimating the relative localization of the aircraft with respect to said reference trajectory from data relating to said at least one selected indicator transmitted by said at least one detector,
d) calculating a confidence index relating to the relative localization estimated from the at least one selected indicator,
e) comparing the calculated confidence index to a predetermined threshold,
f) when the calculated confidence index is greater than the predetermined threshold, guiding the aircraft along the reference trajectory as a function of the estimated relative localization.

Such a method guides the aircraft without risking have it follow a trajectory different to the reference trajectory.

The calculation step of the confidence index of said at least one selected indicator of the method according to the first aspect may be performed as a function of the arrangement of said indicators on the ground with respect to the reference trajectory.

The calculation step of the confidence index relating to the relative localization estimated from said at least one selected indicator of the method according to the first aspect may be performed as a function of the position of the aircraft with respect to said at least one selected indicator and of the reference trajectory.

This quantifies the confidence which may be accorded to an estimation of localization of the aircraft as a function of the positions of the indicators and of the aircraft with respect to each other and with respect to the trajectory which the aircraft must follow.

When the confidence index relating to the estimated relative localization is less than the predetermined threshold, the data-processing module selects at least one new indicator on the ground, estimates the relative localization of the aircraft with respect to the reference trajectory from said at least one new selected indicator, calculates a confidence index relating to the relative localization estimated from the at least one new selected indicator and compares the calculated confidence index to the predetermined threshold.

This means not guiding the aircraft from an estimated localization insufficiently dependable and risking having the aircraft follow a wrong direction, but rather finding a localization having a level of confidence sufficient to be used to guide the aircraft.

When the confidence index relating to the estimated relative localization is less than the predetermined threshold, the data-processing module may transmit an alarm message requiring the aircraft to either be piloted in manual mode or warning that the aircraft is switching to manual mode.

This warns the pilot and asks him to assume control of the aircraft or warns him of automatic switching to manual mode when the layout indicators of the processing module do not perform sufficiently safe guiding of the aircraft.

When the confidence index relating to the estimated localization is less than the predetermined threshold, the data-processing module may guide the aircraft from the reference trajectory.

This continues the guiding of the aircraft autonomously without taking into account those data relating to the indicators on the ground transmitted by the detectors. In this way this solution does not risk guiding the aircraft in a wrong direction when the layout indicators are not considered as dependable.

In a first variant embodiment, the processing module performs the determination step of the uncertainty areas repeatedly over time.

In a second variant embodiment, the processing module performs the determination step of the uncertainty areas when the aircraft enters the taxiing phase.

This determines if the aircraft is risking encountering a complex area needing a guiding method adapted to limit the risk of guiding the aircraft in a wrong direction being deployed.

According to a second aspect, the invention relates to a computer program product comprising code instructions for executing a guiding method according to the first aspect, when this program is executed by a processor.

According to a third aspect, the invention relates to a data-processing module which may be connected to at least one detector of a plurality of indicators localized on a platform on the ground, said at least one detector being loaded on board an aircraft and said data-processing module being configured for:

a) determining complex uncertainty areas of the platform geometrically from a mapping of the platform,
b) near one of said determined uncertainty areas, selecting at least one indicator from the plurality of indicators on the ground,
c) estimating the relative localization of the aircraft with respect to a reference trajectory from data relating to said at least one selected indicator transmitted by said at least one detector,
d) calculating a confidence index relating to the relative localization estimated from the at least one selected indicator,
e) comparing the calculated confidence index to a predetermined threshold,
f) when the calculated confidence index is greater than the predetermined threshold, guiding the aircraft along the reference trajectory as a function of the estimated relative localization.

According to a fourth aspect, the invention relates to a system for guiding an aircraft along a reference trajectory on a platform on the ground comprising: at least one detector, a plurality of indicators on the ground and a data-processing module according to the third aspect.

Such computer program product, processing module and guiding system have the same advantages as those mentioned for the method according to the first aspect.

PRESENTATION OF THE FIGURES

Other features and advantages of the present invention will become apparent upon reading the description which follows of an embodiment of the invention. This description will be given with reference to the appended drawings wherein.

DETAILED DESCRIPTION

Figure 1:
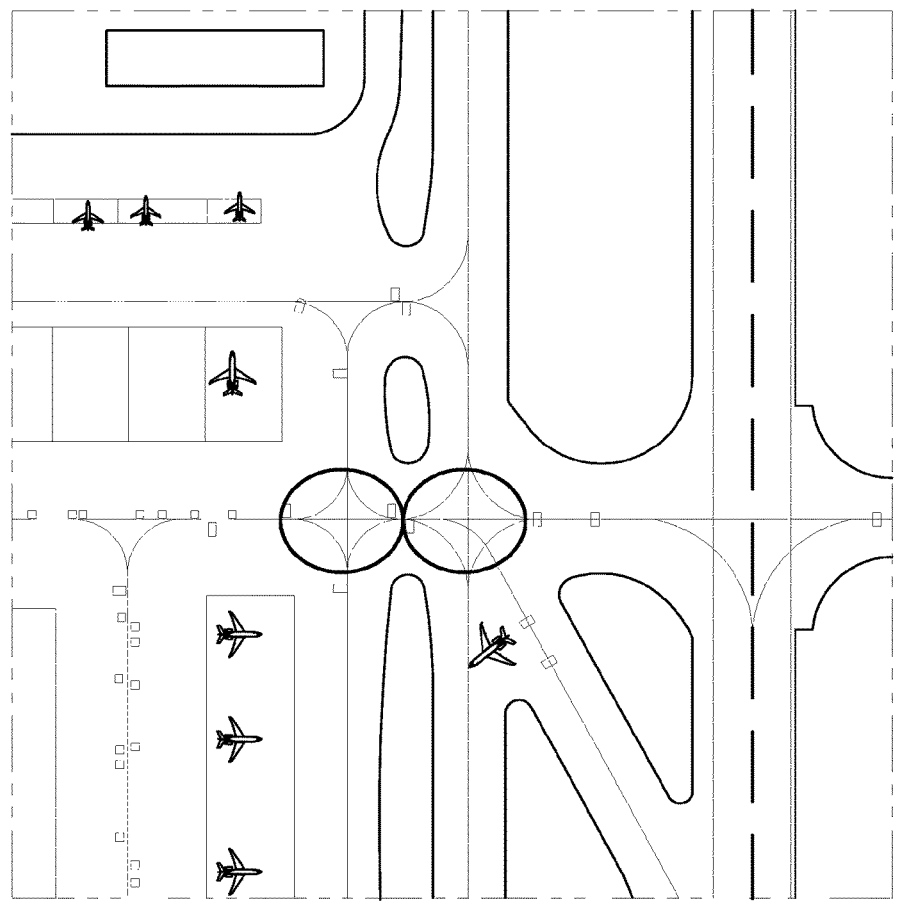
FIG. 1 illustrates taxiing areas such as cross-over areas may have complex topology.
Figure 2:
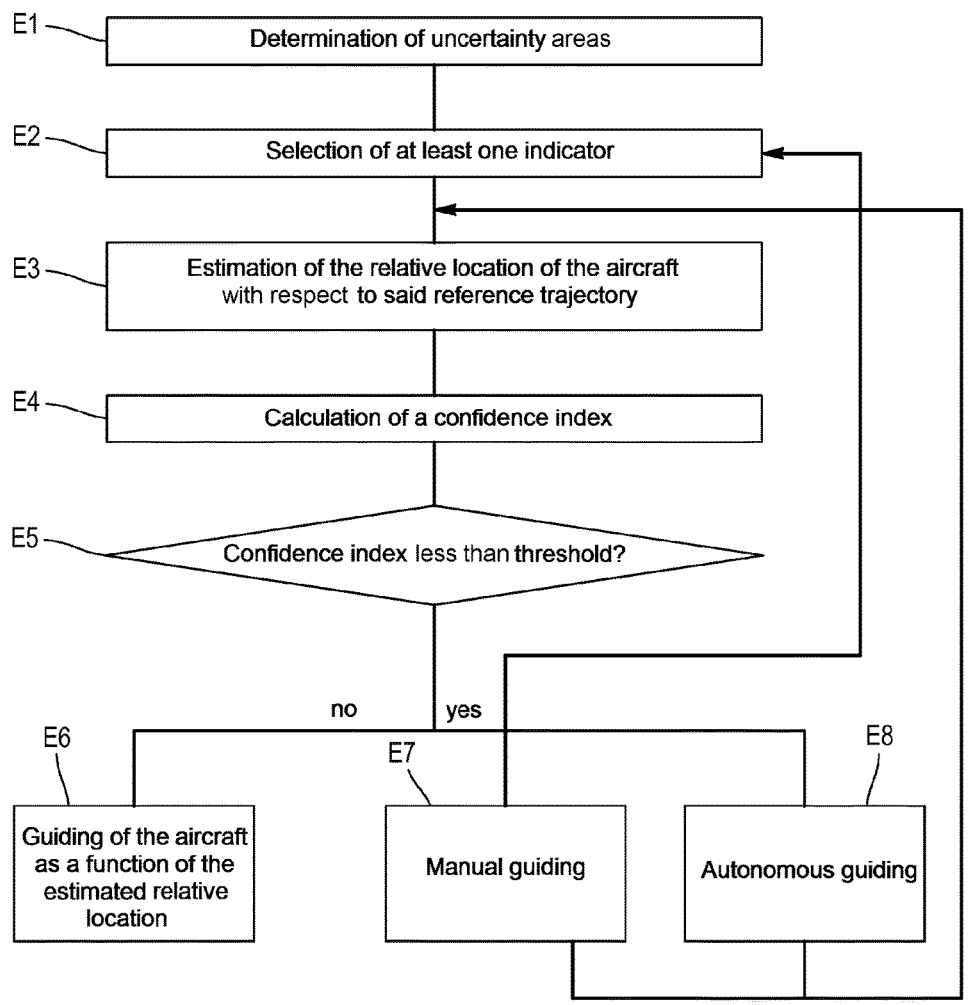
FIG. 2 is a diagram showing an implementation of a guiding method according to the invention.
Figure 3:
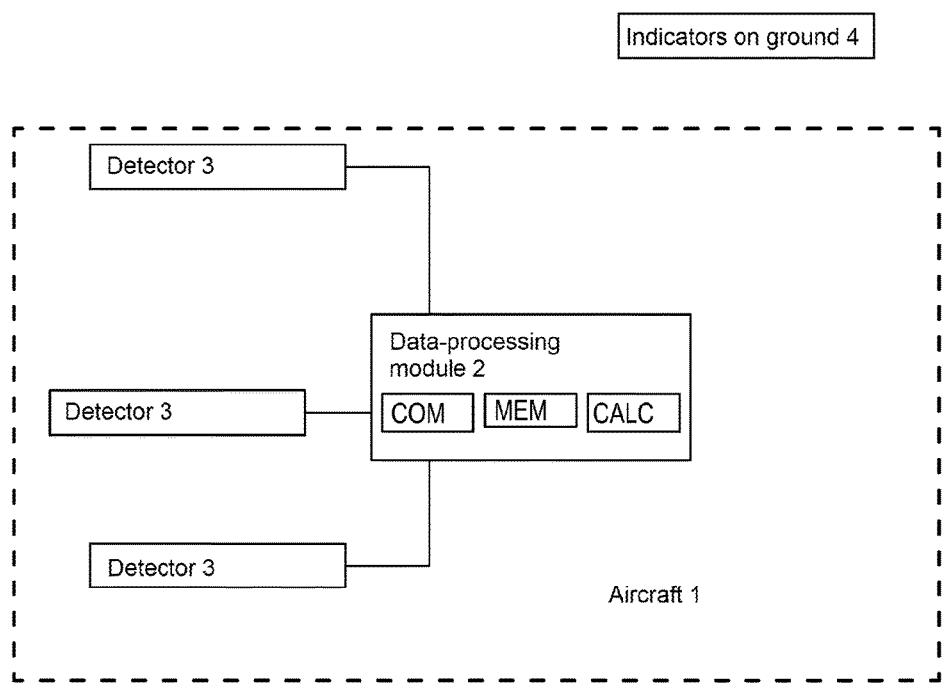
FIG. 3 shows a guiding system according to an embodiment of the invention.

With reference to FIG. 2, an embodiment of the invention relates to a method for guiding an aircraft 1 along a reference trajectory on a platform applied by a data-processing module 2 of a system for guiding an aircraft illustrated in FIG. 3.

Such a system comprises indicators on the ground 4 used for marking the taxiing areas of the platform and at least one detector 3 loaded on board the aircraft 1 and adapted for detecting the position of such indicators on the ground. Such a detector senses the signals sent or reflected by said indicators on the ground. Such a detector may for example be an optical or optoelectronic sensor sensing light emitted by light sources such as lamps or reflected by reflective markings. Such a detector may also be a radiofrequency receiver receiving radio signals emitted by antennas positioned on the ground.

Said detectors 3 may be connected to the processing module 2 so as to provide it with measurement data allowing the processing module 2 to determine the relative localization of the aircraft 1 with respect to these indicators 4.

The data-processing module 2 may include communication means such as a communication interface COM, computing means such as a computer CALC and storage means MEM. Such a computer may consist in a processor or microprocessor, of the x-86 or RISC type for example, a controller or micro-controller, a DSP, an integrated circuit such as an ASIC or programmable circuit such as an FPGA, a combination of such elements or any other combination of components giving the possibility of applying the computing steps of the method described below. The MEM storage means may consist in any type of computer bulk storage such as a magnetic hard disc with a plate, an SSD disc, flash memory or further a CD-ROM or DVD-ROM reader.

Said communication means COM may be used for communicating with the detectors 3. The MEM storage means may notably be used for storing one or several mapping representations of the airport platform on which the aircraft 1 has to be guided.

The data-processing module 2 may be connected to at least one computer of the aircraft or be integrated therein, so as to be able to transmit to it commands for guiding the aircraft.

The method according to the invention proposes an improved guiding of the aircraft along a reference trajectory for limiting the probability of guiding errors during guiding in a complex area such as a cross-over area.

While a guiding method is being performed, the relative localization of the aircraft with respect to the reference trajectory is estimated from data on indicators on the ground transmitted by the detectors, such as the position of the indicators with respect to the plane. This estimation of the aircraft localization is used to carry out guiding of the aircraft along this reference trajectory. The method according to the invention proposes verifying that the indicators on the ground considered for determining the relative localization of the aircraft are pertinent with respect to the reference trajectory to be followed. So if an aircraft is at a cross-over between a rectilinear track and a curved track and the trajectory to be followed by the aircraft must guide it along the rectilinear track, the method according to the invention prevents the indicators localized along the curved track being employed for guiding the aircraft. Such guiding could assign to the aircraft the curved track instead of the rectilinear track and would risk putting the aircraft in a dangerous situation.

For this, for a relative localization estimated from some indicators on the ground, the method calculates a confidence index. Such a confidence index represents the probability that these indicators on the ground are appropriate for guiding the aircraft, given the trajectory occupied by the latter.

More precisely, in reference to FIG. 2, during a determination step E1, the data-processing module determines one or more complex uncertainty areas of the platform geometrically from a mapping of the platform. Such a determination step may be conducted at the start of a taxiing phase. Alternatively, such a determination step may be performed repeatedly over time during a taxiing phase.

During a selection step E2, the processing module selects from the plurality of indicators on the ground detected by the detectors of the aircraft at least one indicator. Such a selection step is performed when the aircraft is in or near an uncertainty area determined during determination step E1. These selected indicators are those the processing module will then try to use to proceed with guiding the aircraft.

During an estimation step of relative localization E3, the processing module 2 estimates the relative localization of the aircraft with respect to the reference trajectory from data relating to selected indicators during the selection step E2 transmitted by the detectors. This estimation may for example govern the position of the aircraft with respect to an indicator or a couple of indicators.

During a calculation step E4, the processing module 2 verifies the pertinence of the selected indicators used during the estimation step of relative localization E3 with respect to the reference trajectory to be followed. For this the processing module calculates for the relative localization estimated from these selected indicators a confidence index indicating the probability that these selected indicators mark a path the aircraft is best to take in following the reference trajectory.

According to a first embodiment, calculation of the confidence index is performed as a function of the arrangement of the selected indicators with respect to the reference trajectory. For example, indicators may be considered as adapted if they are positioned along a trajectory similar to the reference trajectory. The confidence index linked to these indicators could be high. Inversely, if selected indicators form a curved line indicating a bend whereas the reference trajectory is a straight line, the indicators may be considered as inadequate and the associated confidence index may be low.

According to a second embodiment, calculation of the confidence index is done as a function of the position of the aircraft with respect to the selected indicators and the reference trajectory. The processing module may for example compare the position of the aircraft with respect to the selected indicators and the localization of the aircraft with respect to the reference trajectory. If the selected indicators are inadequate and do not follow the reference trajectory, the aircraft following the reference trajectory will move away from the selected indicators but not from the reference trajectory. The gap between the relative position of the aircraft with respect to the selected indicators and the relative localization of the aircraft with respect to the reference trajectory may then have a sudden variation. The confidence index associated with such inadequate indicators could be low.

Calculation of the confidence index may be a function of a level of geometric complexity of the uncertainty area travelled by the aircraft or of external conditions such as meteorological conditions. The confidence index may be fixed to a very low value predetermined voluntarily when conditions are fulfilled in which calculation of the confidence index is known to give unreliable results.

During a comparison step E5, the processing module compares the calculated confidence index to a predetermined threshold.

During a guiding step E6 the processing module guides the aircraft along the reference trajectory as a function of the estimated relative localization if the confidence index is greater than the predetermined threshold. Once the relative localization has been recognized as dependable, the processing module may use it to correct the trajectory of the plane so that the latter properly follows the reference trajectory.

If the confidence index is less than the threshold, the estimated relative position cannot be used for guiding the plane and the processing module again executes the steps of selecting E2, estimating relative localization E3, calculating E4 and comparing E5: the processing module selects at least one new indicator, estimates the relative localization of the aircraft from the new indicators, calculates the associated confidence index and compares it to the predetermined threshold.

The processing module may repeat these steps provided the confidence index remains under the threshold.

According to an embodiment, when a confidence index is less than the threshold, the processing module may transmit an alarm message to the pilot requiring the aircraft to be piloted in manual mode or warning that the aircraft is switching to manual mode during a manual guiding step E7. Such a message may for example be sent after a predetermined number of negative comparisons, after a certain time has elapsed without a confidence index being greater than the threshold or even when there is no longer a new indicator for which no confidence index has been calculated. The processing module then considers that the indicators selected during the preceding steps do not allow reliable guiding of the aircraft and the pilot should ensure manual guiding of the aircraft. Switching to manual mode may be automatic on completion of emission of the alarm message, for example after expiration of a countdown of predetermined duration. In such an embodiment sending such a message requiring manual guiding of the aircraft or automatic switching to manual mode accompanied by an alert may be imposed by systematically fixing during the calculation step E4 the confidence index at a very low value predetermined voluntarily until the alarm message is sent.

Also, when a confidence index is less than the predetermined threshold the processing module may decide to guide the aircraft from the reference trajectory during an autonomous guiding step E8, without considering the estimated relative localization or localizations since these relative localizations have not been deemed reliable. The processing module may also take into account information on absolute localization provided for example by a GPS module. The aircraft continues to be guided but blindly without using the information issued by the detectors.

According to an embodiment, if the aircraft is piloted in manual mode and is in an uncertainty area, the processing module may still execute the steps of selecting E2, estimating relative localization E3, calculating E4 and comparing E5 and may propose that the pilot return to automatic guiding mode when a confidence index is greater than the predetermined threshold. The processing module has a relative localization considered as reliable enabling it to perform automatic guiding of the aircraft in the uncertainty area along the reference trajectory. The automatic guiding mode may also be reinitiated automatically when a confidence index is greater than the predetermined threshold.

According to an embodiment, when the aircraft exits an uncertainty area, the processing module may propose that the pilot cease calculating a confidence index for the estimated localization. Each estimated localization is then considered as reliable and could be used for guiding the aircraft without questioning the indicators selected to evaluate this localization. The processing module may remain in this simplified guiding mode provided the aircraft is not back near or in an uncertainty area.

The invention claimed is:

1. A method for guiding along a reference trajectory on a platform on the ground an aircraft having on board at least one detector of a plurality of indicators on the ground,
said method comprising the following steps performed by a data-processing module capable of being connected to said at least one detector:
a) determining complex uncertainty areas of the platform geometrically from a mapping of the platform, wherein the uncertainty areas are complex taxiing areas comprising cross-over areas,
b) near one of said determined uncertainty areas, selecting at least one indicator from the plurality of indicators on the ground,
c) estimating the relative localization of the aircraft with respect to said reference trajectory from data relating to said at least one selected indicator transmitted by said at least one detector, d) calculating a confidence index representing a probability that the at least one selected indicator is located on the reference trajectory of the aircraft, e) comparing the calculated confidence index to a predetermined threshold, f) when the calculated confidence index is greater than the predetermined threshold, guiding the aircraft along the reference trajectory as a function of the estimated relative localization.

2. The method according to claim 1, wherein the calculation step of the confidence index of said at least one selected indicator is performed as a function of the arrangement of said indicators on the ground with respect to the reference trajectory.

3. The method according to claim 1, wherein the calculation step of the confidence index of said at least one selected indicator is performed as a function of the position of the aircraft with respect to said at least one selected indicator and of the reference trajectory.

4. The method according to claim 1, wherein when the confidence index is less than the predetermined threshold, the data-processing module selects at least one new indicator on the ground, estimates the relative localization of the aircraft with respect to the reference trajectory from said at least one new selected indicator, calculates a confidence index relating to the at least one new selected indicator and compares the calculated confidence index to the predetermined threshold.

5. The method according to claim 1, wherein when the confidence index is less than the predetermined threshold, the data-processing module transmits an alarm message requiring the aircraft to either be piloted in manual mode or warning that the aircraft is switching to manual mode.

6. The method according to claim 1, wherein when the confidence index is less than the predetermined threshold, the data-processing module guides the aircraft from the reference trajectory.

7. The method according to claim 1, wherein the processing module performs the determination step of the uncertainty areas repeatedly over time.

8. The method according to claim 1, wherein the processing module performs the determination step of the uncertainty areas when the aircraft enters the taxiing phase.

9. A computer program product comprising code instructions for executing a guiding method according to claim 1, when this program is executed by a processor.

10. A data-processing module comprising a module connected to at least one detector of a plurality of indicators localized on a platform on the ground, said at least one detector being loaded on board an aircraft and said data-processing module being configured for:

a) determining complex uncertainty areas of the platform geometrically from a mapping of the platform, wherein uncertainty areas are taxiing areas that present complex topology, such as cross-over areas, b) near one of said determined uncertainty areas, selecting at least one indicator from the plurality of indicators on the ground, c) estimating the relative localization of the aircraft with respect to a reference trajectory from data relating to said at least one selected indicator transmitted by said at least one detector, d) calculating a confidence index representing a probability that the at least one selected indicator is located on the reference trajectory of the aircraft, e) comparing the calculated confidence index to a predetermined threshold, f) when the calculated confidence index is greater than the predetermined threshold, guiding the aircraft along the reference trajectory as a function of the estimated relative localization.

11. A system for guiding an aircraft along a reference trajectory on a platform on the ground comprising: at least one detector, a plurality of indicators on the ground and a data-processing module according to claim 10.

\* \* \* \* \*